United States Patent
Cuesta et al.

(10) Patent No.: US 11,422,145 B2
(45) Date of Patent: Aug. 23, 2022

(54) TEMPERATURE CORRECTION OF VERTICAL SPEED OF AIRCRAFT

(71) Applicant: C SERIES AIRCRAFT MANAGING GP INC., Mirabel (CA)

(72) Inventors: Dimitri Cuesta, St-Eustache (CA); Guillaume Savoie-Chiasson, Montreal (CA)

(73) Assignee: AIRBUS CANADA MANAGING GP INC., Mirabel (CA)

( * ) Notice: Subject to any disclaimer, the term of this patent is extended or adjusted under 35 U.S.C. 154(b) by 213 days.

(21) Appl. No.: 16/610,214

(22) PCT Filed: Apr. 27, 2018

(86) PCT No.: PCT/IB2018/052947
§ 371 (c)(1),
(2) Date: Nov. 1, 2019

(87) PCT Pub. No.: WO2018/203200
PCT Pub. Date: Nov. 8, 2018

(65) Prior Publication Data
US 2020/0072864 A1 Mar. 5, 2020

Related U.S. Application Data

(60) Provisional application No. 62/500,194, filed on May 2, 2017.

(51) Int. Cl.
*G01P 3/62* (2006.01)
*G01C 21/16* (2006.01)
*G01C 5/06* (2006.01)

(52) U.S. Cl.
CPC .............. *G01P 3/62* (2013.01); *G01C 21/165* (2013.01); *G01C 5/06* (2013.01)

(58) Field of Classification Search
CPC ............ G01P 3/62; G01C 21/165; G01C 5/06
See application file for complete search history.

(56) References Cited

U.S. PATENT DOCUMENTS

| 3,589,648 | A | 6/1971 | Gorham et al. | |
|---|---|---|---|---|
| 6,317,663 | B1 * | 11/2001 | Meunier | B64D 45/04 340/945 |
| 9,153,139 | B2 | 10/2015 | De Tarso Ferreira et al. | |

(Continued)

OTHER PUBLICATIONS

Jeremy Vezinet, Study of Future On-board BNSS/INS Hybridization Architectures, INP Toulouse Theses, Dec. 18, 2014.

(Continued)

*Primary Examiner* — Elias Desta
(74) *Attorney, Agent, or Firm* — Norton Rose Fulbright Canada LLP

(57) ABSTRACT

The present disclosure provides methods and systems for correcting a vertical speed of an aircraft. An instantaneous vertical speed of the aircraft is obtained, based on inertial data from an inertial reference unit on the aircraft. A first correction is applied to the instantaneous vertical speed to generate a baro-inertial vertical speed, and a second correction is applied to the baro-inertial vertical speed based on an error between a geometric vertical speed and the baro-inertial vertical speed to obtain a temperature-corrected baro-inertial vertical speed.

12 Claims, 7 Drawing Sheets

(56) References Cited

U.S. PATENT DOCUMENTS 9,377,783 B2 * 6/2016 Riedinger .............. G01C 23/00

OTHER PUBLICATIONS

AlliedSignal Electronic & Avionics System, Description of Geometric Altitude for the EGPWS, 1998, AlliedSignal Inc.
R. L. Blanchard, A New Algorithm for Computing Inertial Altitude and Vertical Volocity, Nov. 1, 1971, pp. 1143-1146, vol. AES-10, No. 6, IEEE, NJ, United States of America.
PCT international Search Report and Written Opinion dated Aug. 7, 2018 re: International Application No. PCT/IB2018/052947.

* cited by examiner

TEMPERATURE CORRECTION OF VERTICAL SPEED OF AIRCRAFT

CROSS-REFERENCE TO RELATED APPLICATION(S)

This application is a national phase application under 35 U.S.C. 371 of International Patent Application No. PCT/162018/052947 filed on Apr. 27, 2018, which claims priority from U.S. Provisional Patent Application Ser. No. 62/500,194 filed on May 2, 2017, the entire content of which is incorporated herein by reference.

TECHNICAL FIELD

The present disclosure relates generally to the correction of a temperature-based error on the vertical speed of aircraft.

BACKGROUND

An air data inertial reference unit (IRU) is a key component of an aircraft control system. It supplies information such as altitude, as well as inertial reference information (position and altitude) to an electronic flight instrument system display as well as to other systems on the aircraft. Pilots rely on the information provided by the IRU to determine the aircraft's rotational altitude and translational position over time.

The IRU provides an aircraft vertical speed signal calculated in a vertical axis relative to the surface of the earth. This is done by integrating data obtained by the accelerometer of the IRU and converting velocity data from the aircraft body axis to the earth axis. However, the aircraft vertical speed signal tends to accumulate errors over time. While in some flight phases, such as take-off or cruise, the errors may be ignored, there are other flight phases, such as landing, where the accumulated error may have an impact on the pilot's ability to properly operate the aircraft.

While some correction techniques exist, most are based on the use of Global Positioning System (GPS) data, which is an external input and thus may not always be reliable. As such, there is a need for improvement.

SUMMARY

The present disclosure provides methods and systems for correcting a vertical speed of an aircraft. A correction is applied to a baro-inertial vertical speed based on an error between a geometric vertical speed and the baro-inertial vertical speed to obtain a temperature-corrected baro-inertial vertical speed.

In accordance with a first broad aspect, there is provided a method for correcting a vertical speed of an aircraft. The method comprises obtaining an instantaneous vertical speed of the aircraft based on inertial data from an inertial reference unit on the aircraft, applying a first correction to the instantaneous vertical speed to generate a baro-inertial vertical speed, and applying a second correction to the baro-inertial vertical speed based on an error between a geometric vertical speed and the baro-inertial vertical speed to obtain a temperature-corrected baro-inertial vertical speed.

In some embodiments, applying the second correction to the baro-inertial vertical speed comprises applying a time-based function of the error between the geometric rate of change and the pressure altitude rate of change.

In some embodiments, the time-based function of the error is estimated as a moving-average of an instantaneous error between the geometric vertical speed and the baro-inertial vertical speed, over a given portion of time prior to a current time.

In some embodiments, the given portion of time is about 20 seconds.

In some embodiments, the time-based function of the error is estimated as an output of a first order filter applied on an instantaneous error between the geometric vertical speed and the baro-inertial vertical speed, the first order filter having a time-constant that matches a time constant used to apply the first correction.

In some embodiments, the instantaneous error corresponds to:

$$Err_{inst} = \left( \frac{V_{z,Geom}}{V_{z,Press}} \cdot V_{z,BI} - V_{z,BI} \right)$$

where $V_{z,Geom}$ in is a geometric vertical speed, $V_{z,Press}$ is a pressure altitude vertical speed, and $V_{z,BI}$ is the baro-inertial vertical speed.

In some embodiments, $$\frac{V_{z,Geom}}{V_{z,Press}}$$

is computed as:

$$\frac{T_s}{T_i + T' \cdot H}$$

where $T_s$ is static temperature at a given altitude, $T_i$ is temperature at sea-level altitude, $T'$ is temperature lapse-rate, and $H$ is altitude.

In some embodiments, $T_s$ and $H$ are measured from air data sensors on the aircraft, and $H$ is approximated as pressure altitude.

In some embodiments, applying the first correction to the instantaneous vertical speed comprises applying the first correction using pressure altitude data for the aircraft.

In accordance with another broad aspect, there is provided a system for correcting a vertical speed of an aircraft. The system comprises a processing unit and a non-transitory memory communicatively coupled to the processing unit and comprising computer-readable program instructions. The instructions are executable by the processing unit for obtaining an instantaneous vertical speed of the aircraft based on inertial data from an inertial reference unit on the aircraft, applying a first correction to the instantaneous vertical speed to generate a baro-inertial vertical speed, and applying a second correction to the baro-inertial vertical speed based on an error between a geometric vertical speed and the baro-inertial vertical speed to obtain a temperature-corrected baro-inertial vertical speed.

In some embodiments, applying the second correction to the baro-inertial vertical speed comprises applying a time-based function of the error between the geometric rate of change and the pressure altitude rate of change.

In some embodiments, the time-based function of the error is estimated as a moving-average of an instantaneous error between the geometric vertical speed and the baro-inertial vertical speed, over a given portion of time prior to a current time.

In some embodiments, the given portion of time is about 20 seconds.

In some embodiments, the time-based function of the error is estimated as an output of a first order filter applied on an instantaneous error between the geometric vertical speed and the baro-inertial vertical speed, the first order filter having a time-constant that matches a time constant used to apply the first correction.

In some embodiments, the instantaneous error corresponds to:

$$Err_{inst} = \left( \frac{V_{z,Geom}}{V_{z,Press}} \cdot V_{z,BI} - V_{z,BI} \right)$$

where $V_{z,Geom}$ in is a geometric vertical speed, $V_{z,Press}$ is a pressure altitude vertical speed, and $V_{z,BI}$ is the baro-inertial vertical speed.

$$\frac{V_{z,Geom}}{V_{z,Press}}$$

In some embodiments, is computed as:

$$\frac{T_s}{T_i + T' \cdot H}$$

where $T_s$ is static temperature at a given altitude, $T_i$ is temperature at sea-level altitude, T' is temperature lapse-rate, and H is altitude.

In some embodiments, $T_s$ and H are measured from air data sensors on the aircraft, and H is approximated as pressure altitude.

In some embodiments, applying the first correction to the instantaneous vertical speed comprises applying the first correction using pressure altitude data for the aircraft.

In accordance with another broad aspect, there is provided a computer readable medium having stored thereon program code executable by a processor for correcting a vertical speed of an aircraft. The program code comprises instructions for obtaining an instantaneous vertical speed of the aircraft based on inertial data from an inertial reference unit on the aircraft, applying a first correction to the instantaneous vertical speed to generate a baro-inertial vertical speed, and applying a second correction to the baro-inertial vertical speed based on an error between a geometric vertical speed and the baro-inertial vertical speed to obtain a temperature-corrected baro-inertial vertical speed.

In some embodiments, applying the second correction to the baro-inertial vertical speed comprises applying a time-based function of the error between the geometric rate of change and the pressure altitude rate of change.

In accordance with yet another broad aspect, there is provided a method for determining an aircraft flight path vector. The method comprises obtaining a baro-inertial vertical speed based on an instantaneous vertical speed of the aircraft from an inertial reference unit on the aircraft, applying a correction to the baro-inertial vertical speed based on an error between a geometric vertical speed and the baro-inertial vertical speed to obtain a temperature-corrected baro-inertial vertical speed, and calculating the aircraft flight path vector using the temperature-corrected baro-inertial vertical speed.

In some embodiments, applying the correction to the baro-inertial vertical speed comprises applying a time-based function of the error between the geometric rate of change and the pressure altitude rate of change.

In some embodiments, the method further comprises determining a slope of approach for landing the aircraft and comparing the slope of approach to a threshold, wherein the correction is applied to the baro-inertial vertical speed when the slope of approach is greater than the threshold.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
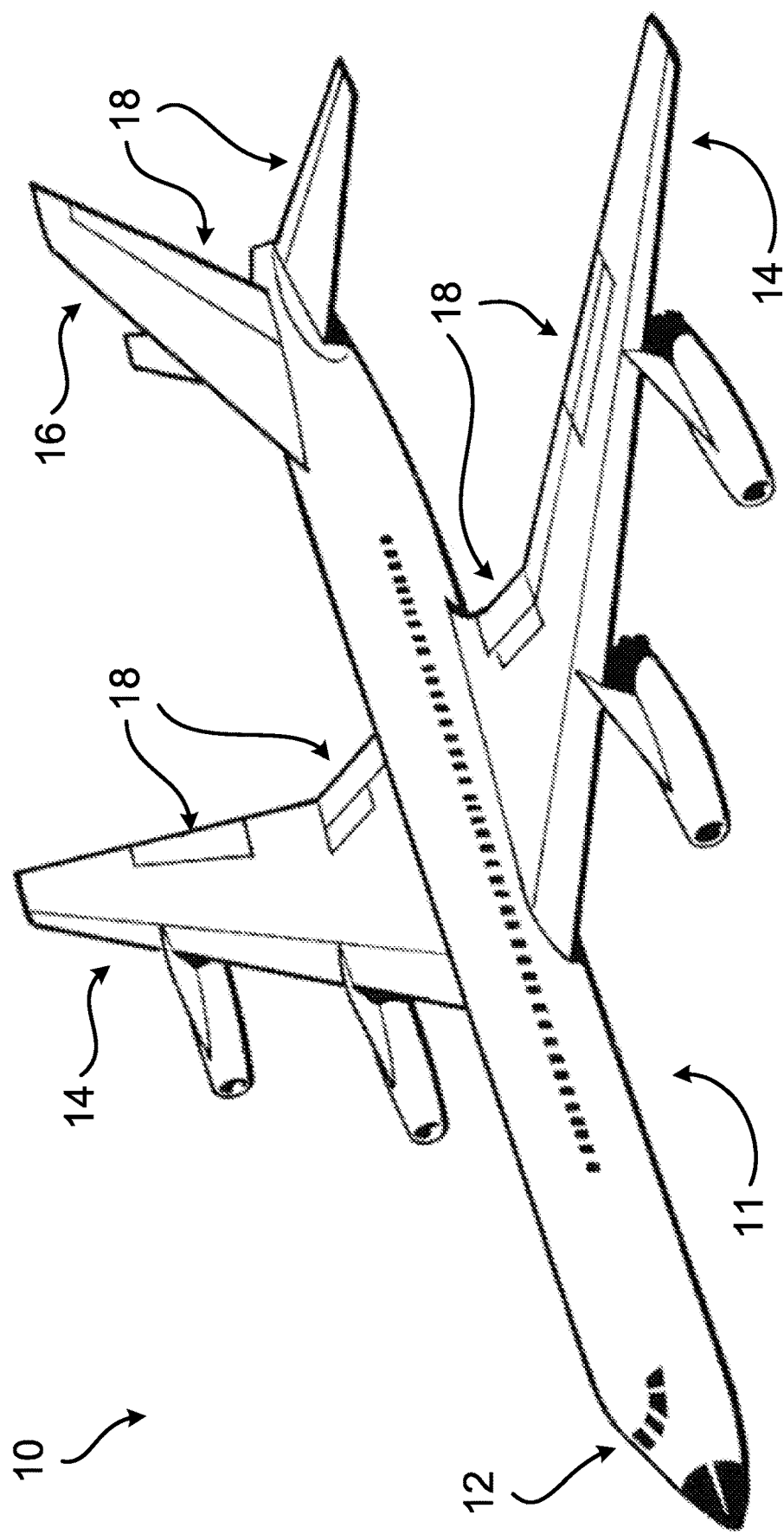
FIG. 1 is a diagram of an example aircraft.

With reference to FIG. 1, an aircraft 10, having a fuselage 11, a pair of wings 14, and a tail 16, is equipped with a cockpit 12 and one or more flight components 18. The aircraft 10 can be any type of aircraft, including propeller planes, jet planes, turbojet planes, turbo-propeller planes, turboshaft planes, gliders, and the like. The cockpit 12 may be positioned at any suitable location on the aircraft 10, for example at a front portion of the fuselage 11. The cockpit 12 is configured for accommodating one or more pilots who control the aircraft 10 by way of one or more operator controls. The operator controls may include any suitable number of pedals, yokes, steering wheels, centre sticks, flight sticks, levers, knobs, switches, and the like.

Figure 2:
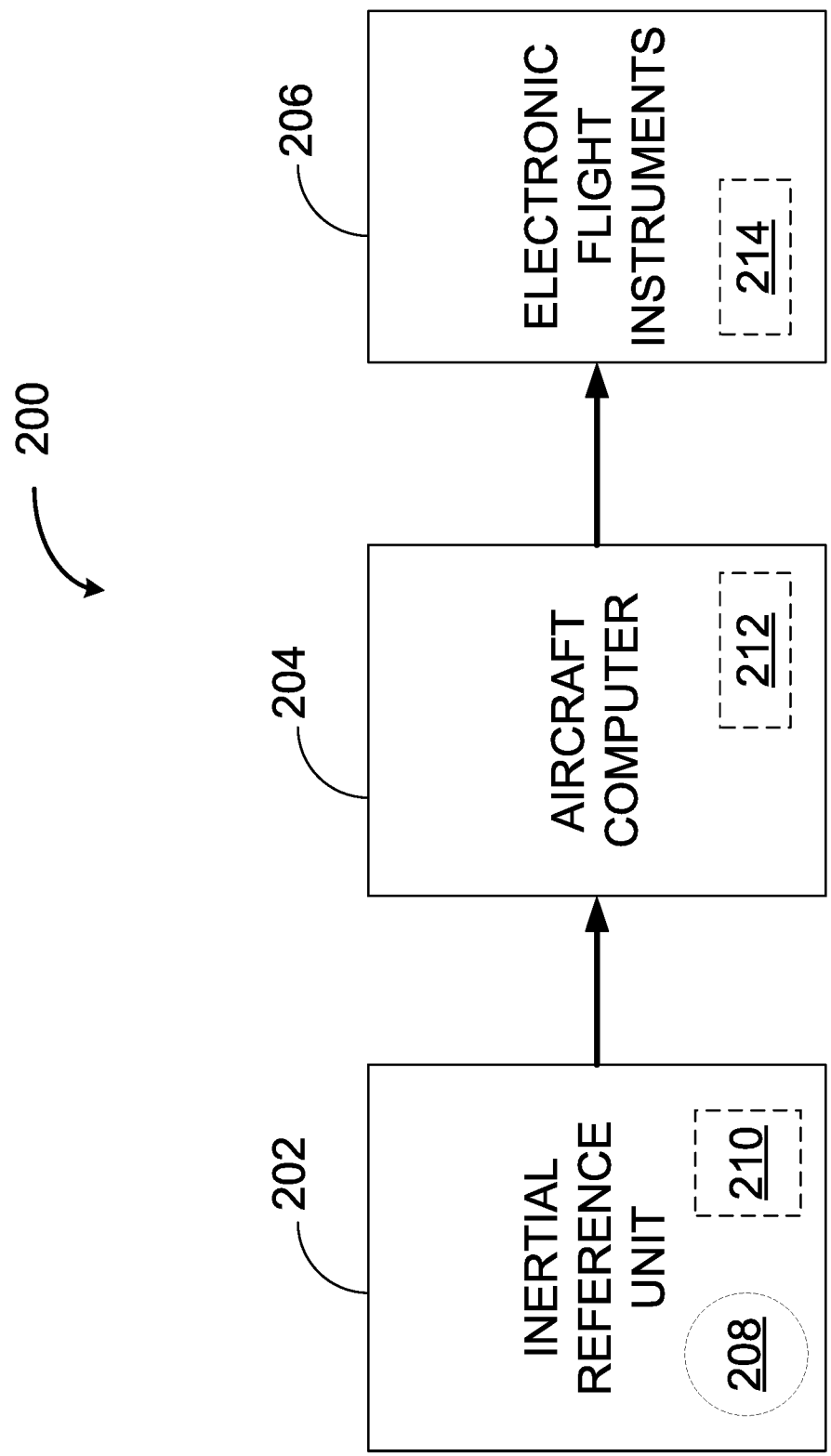
FIG. 2 is a block diagram of part of an avionics system, in accordance with some embodiments.

The aircraft 10 may be equipped with any suitable number of control systems. For example, the aircraft 10 has an avionics system and an electrical system. The avionics system can include any number of sensors and control systems for managing the trajectory and operation of the aircraft 10. The electrical system can include power generation and transformation systems, including for powering the avionics systems. With reference to FIG. 2, there is illustrated part of an avionics system 200. An inertial reference unit (IRU) 202 determines a change in rotational altitude and translational position of the aircraft 10 over a period of time, using one or more motion sensors 208 such as gyroscopes and one or more rotation sensors 210 such as accelerometers. Sensor data is collected from the motion sensors 208 and the rotation sensors 210 by the IRU 202 and provided to an aircraft computer 204 for processing. Navigational data is generated by the aircraft computer 204 and transmitted to electronic flight instruments 206, for display to the pilots in the cockpit 12 of the aircraft 10.

In particular, the IRU 202 collects acceleration data from the rotation sensors 210. The aircraft computer 204 integrates the acceleration data over time and, together with an estimate of gravity, uses the integrated acceleration data to determine a vertical speed (or rate of climb) of the aircraft 10. The vertical speed is provided to the electronic flight instruments 206 and displayed on a vertical speed indicator (VSI) 214. The VSI 214 tells the pilot whether the aircraft 10 is climbing, descending, or in level flight. The VSI 214 also gives rate information in feet per minute for the climb or descent.

Since the vertical speed is based on air data, it corresponds to a pressure altitude vertical speed instead of a geometric vertical speed. In the troposphere, the theoretical relationship between the geometric vertical speed and the pressure altitude vertical speed is dependent on temperature and may be expressed as:

$$V_{z,Geom} = V_{z,Press} \cdot \frac{T_s}{T_i + T' \cdot H} \quad (1)$$

In equation (1), $V_{z,Geom}$ is the geometric altitude vertical speed in ft/s, $V_{z,Press}$ is the pressure altitude vertical speed in ft/s, $T_s$ is static temperature at altitude in °K, $T_i$ is temperature at sea-level altitude in °K, T' is temperature lapse-rate in °K/ft, and H is altitude in ft. There is therefore a temperature-based error introduced into a vertical speed calculation when the calculation is based on air data.

In accordance with some embodiments, the aircraft computer 204 comprises a module 212 to correct the vertical speed of the aircraft due to the temperature-based error introduced into the vertical speed when using air data. In some alternative embodiments, module 212 can be provided separately from the aircraft computer 204 and operatively connected thereto.

In some embodiments, module 212 applies a correction to a baro-inertial vertical speed in accordance with the following:

$$V_{z,Corr} = E(t) + V_{z,BI} \quad (2)$$

In equation (2), $V_{z,BI}$ is the baro-inertial vertical speed, $E(t)$ is a time-based function representative of a correction to be applied, and $V_{z,Corr}$ is the temperature-corrected baro-inertial vertical speed. The baro-inertial vertical speed corresponds to an instantaneous vertical speed for the aircraft 10 corrected with, for example, pressure altitude data. The temperature-corrected baro-inertial vertical speed is provided to the electronic flight instruments 206 and displayed on the vertical speed indicator 214.

Note that the temperature-based error can take some time to accumulate and therefore, the correction can be determined over time. In some embodiments where lag time is not a consideration, the correction can be applied as an instantaneous error expressed as:

$$Err_{inst} = \left( \frac{V_{z,Geom}}{V_{z,Press}} \cdot V_{z,BI} - V_{z,BI} \right) \quad (3)$$

Rearranging equation (1), we get:

$$\frac{V_{z,Geom}}{V_{z,Press}} = \frac{T_s}{T_i + T' \cdot H} \quad (4)$$

The instantaneous error of equation (3) can thus be expressed as:

$$Err_{inst} = \left( \left( \frac{T_s}{T_i + T' \cdot H} \right) \cdot V_{z,BI} - V_{z,BI} \right) \quad (5)$$

In some embodiments, $T_s$ and H are obtained from air data sensors, H is approximated as pressure altitude, and standard values of 288.15 and −0.00198 are used for $T_i$ and T', respectively. Module 212 can thus calculate the instantaneous error.

In embodiments where a time-based error is determined and applied as a correction, $E(t)$ can be estimated from $Err_{inst}$. For example, $E(t)$ can be estimated as the output of a first-order filter applied on $Err_{inst}$ with a time-constant that matches a time-constant used to correct the instantaneous vertical speed in order to obtain the baro-inertial vertical speed. In another example, $E(t)$ can be estimated as the output of a moving-average of $Err_{inst}$ over a given portion of time prior to the current time. The given portion can be selected as appropriate for a desired accuracy. For example, the moving-average can be determined over 10 seconds, 20 seconds, 30 seconds, 60 seconds, or any other time frame preceding the time at which correction is applied. In some embodiments, the time frame is determined from the specifications of the IRU 202.

Figure 3A:
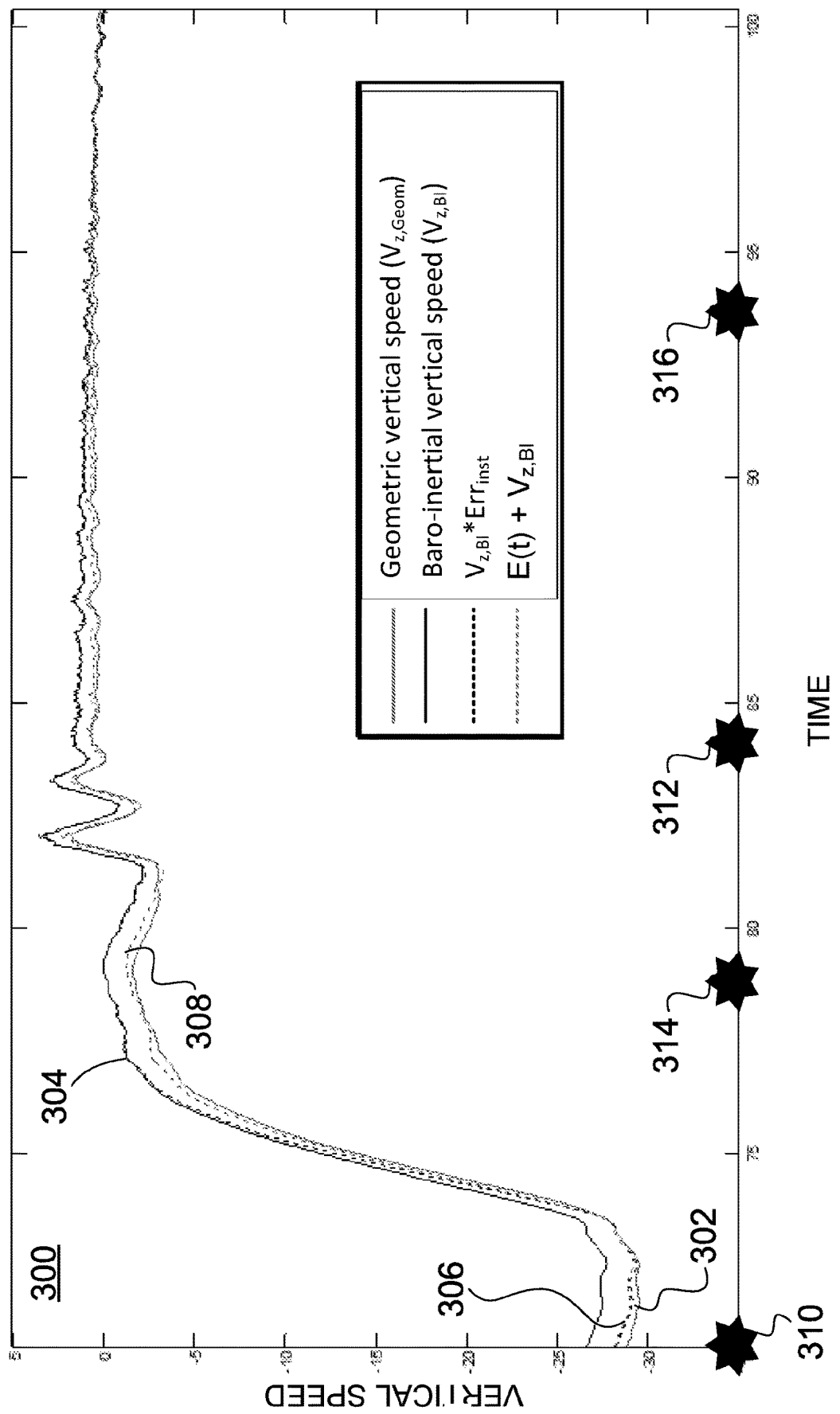
FIG. 3A is a graphical representation of vertical speed over time, in accordance with some embodiments.

FIG. 3A graphically illustrates four different vertical speed parameters over time during the landing phase, namely geometric vertical speed 302, baro-inertial vertical speed 304, temperature-corrected baro-inertial vertical speed using the instantaneous error 306, and temperature-corrected baro-inertial vertical speed using the time-based error 308. All four parameters were measured during a final approach and flare of the aircraft 10, with a temperature of 18° C. above the International Standard Atmosphere (ISA) temperature at the given altitude. The geometric vertical speed 302 was measured using an independent source and is used as a reference. The baro-inertial vertical speed 304 was measured with an IRU, such as IRU 202, without any temperature correction. The temperature-corrected baro-inertial vertical speed using the instantaneous error 306 was obtained by multiplying the measured values of 304 by equation (5). The temperature-corrected baro-inertial vertical speed using the time-based error 308 was obtained by adding the time-based error estimated from equation (5) to the measured values of 304.

When compared to the reference curve 302, the baro-inertial vertical speed 304 has the greatest divergence, particularly when the rate of change of the vertical speed is small. The temperature-corrected baro-inertial vertical speed using the instantaneous error 306 matches the reference curve 302 closely initially and then diverges over time. The temperature-corrected baro-inertial vertical speed using the time-based error 308 is the closest match to the geometric vertical speed 302.

Figure 3B:
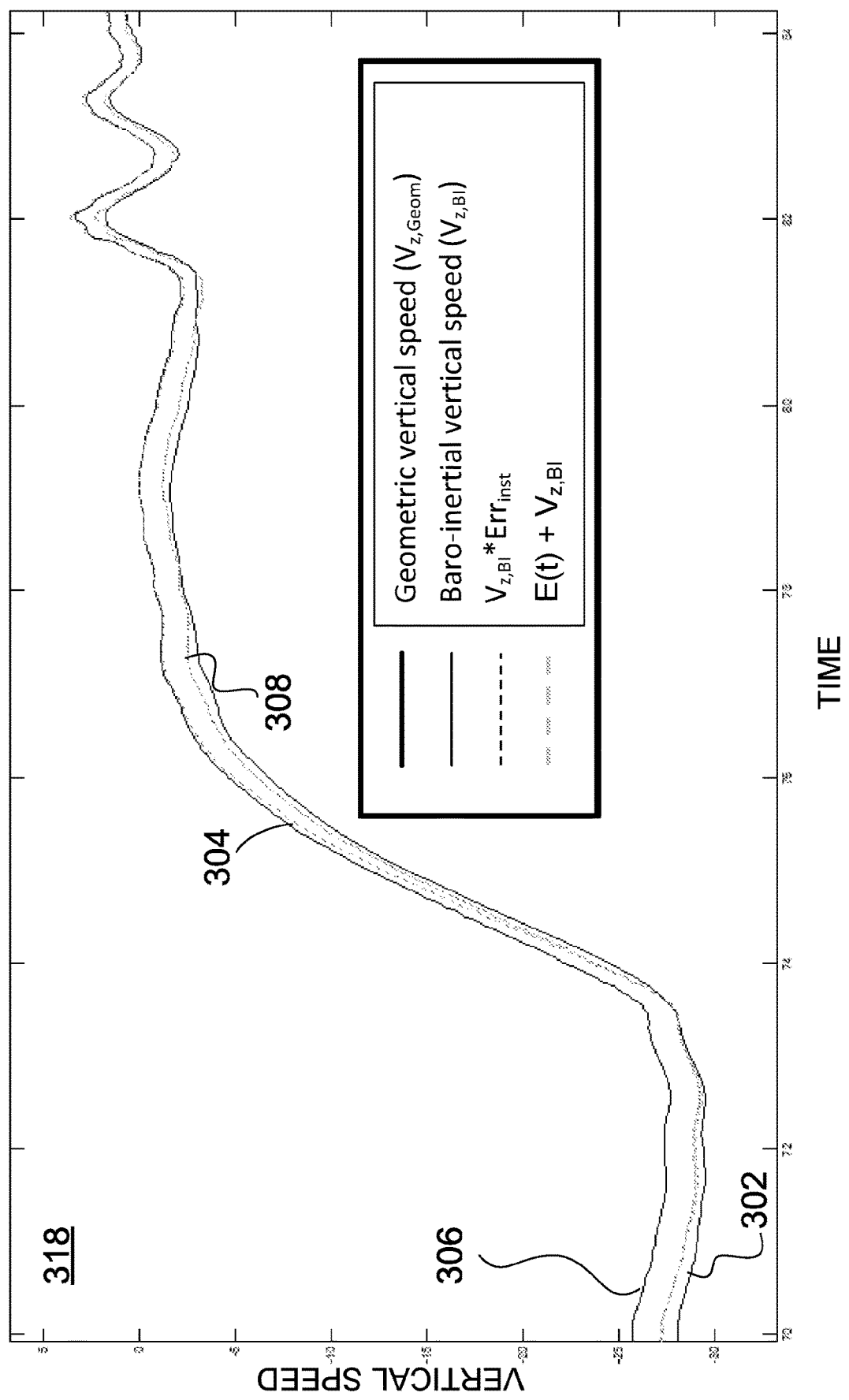
FIG. 3B is an expanded view of a first portion of the graph of FIG. 3A.

FIG. 3B is a graph 318 showing an expanded view of graph 300 for time t=70 s to t=84 s, identified approximately with markers 310 and 312, respectively, in FIG. 3A. Graph 318 corresponds to the flare portion of the landing, where there is a large variation in vertical speed. It can be seen that the temperature-corrected baro-inertial vertical speed using the time-based error 308 follows the reference curve 302 very closely.

Figure 3C:
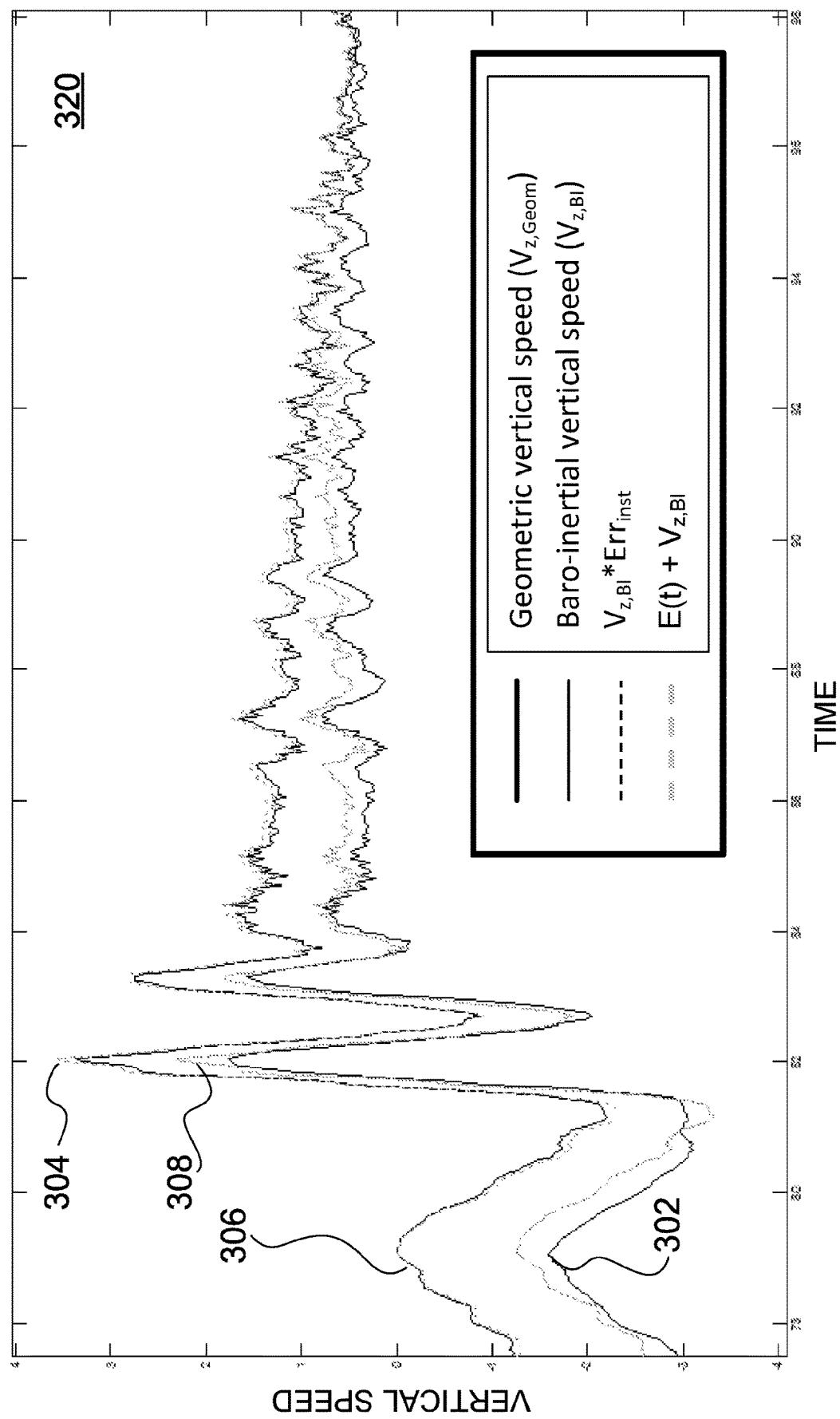
FIG. 3C is an expanded view of a second portion of the graph of FIG. 3A.

FIG. 3C is a graph 320 showing an expanded view of graph 300 for time t=78 s to t=98 s, identified approximately with markers 314 and 316, respectively, in FIG. 3A. Once the vertical speed reaches close to zero, the aircraft 10 has landed. Graph 320 shows how the baro-inertial vertical speed 304 merges with the geometrical vertical speed 302 once the aircraft is on the ground. It also shows that the temperature-corrected baro-inertial vertical speed using the time-based error 308 continues to match the geometric vertical speed 302.

Figure 4:
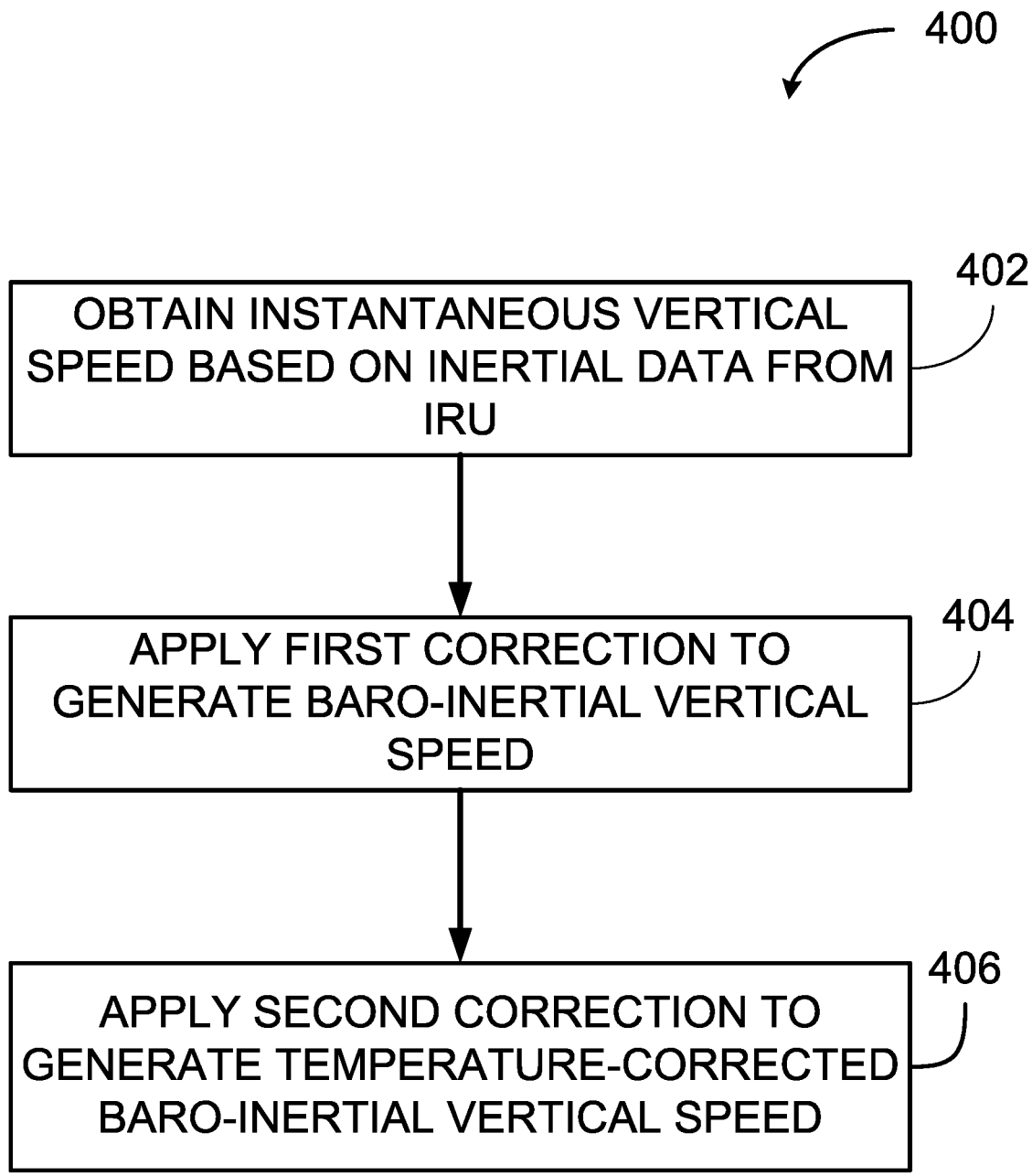
FIG. 4 is a flowchart of an example method for correcting a vertical speed of an aircraft.

Referring now to FIG. 4, there is illustrated a flowchart of an example method 400 as performed by the module 212 of the aircraft computer 204. At step 402, the instantaneous vertical speed of the aircraft is obtained based on inertial data from the IRU 202 of the aircraft 10. As stated previously, the inertial data is obtained by the sensors 208, 210 of the IRU 202. At step 404, a first correction is applied to the instantaneous vertical speed to generate the baro-inertial vertical speed. In some embodiments, the first correction is applied using pressure altitude data also obtained from the sensors 208, 210 of the IRU 202. Alternatively, standard or previously obtained data can be used.

At step 406, a second correction is applied, in order to generate the temperature-corrected baro-inertial vertical speed. In some embodiments, the second correction is time-based, while in other embodiments, it is instantaneous. The time-based correction can be found from the instantaneous error between the geometric vertical speed and the baro-inertial vertical speed, for example, by applying a first order filter to the instantaneous error or as a moving average of the instantaneous error. Other techniques for determining the time-based error can also be used.

In some embodiments, module 212 provided in the aircraft computer 204 uses the temperature-corrected baro-inertial vertical speed to calculate an aircraft flight path vector. The flight path vector represents the rate of change of the position of the aircraft and is used to control the flare of the aircraft during landing. The flare follows the final approach and precedes the touchdown and roll-out phases of the landing. In the flare, the nose of the aircraft is raised, slowing the descent rate, and the proper attitude is set for touchdown. The flight path vector is based on flight path angles and inertial information obtained from the IRU 202. As seen from FIG. 3B, the divergence of the baro-inertial vertical speed 304 from the geometric vertical speed 302 during the flare portion of the landing can introduce errors into the flight path vector, thus affecting the touchdown.

The temperature-corrected baro-inertial vertical speed can thus be combined with a direction of the aircraft in order to produce the flight path vector, which can also be displayed on the electronic flight instruments 206 to guide the pilot. The direction can be determined from the sensors 208, 210 of the IRU 202 or from other aircraft instruments.

In some embodiments, the temperature-corrected baro-inertial vertical speed is only used in steep landing scenarios. For example, the angle of approach of the aircraft can be compared to an angle of approach threshold and when the threshold is exceeded, the temperature-based correction is applied. In some embodiments, the temperature-corrected baro-inertial vertical speed is only used when the outside air temperature deviates from 15° C. by a given amount, such as 5° C., 10° C., or any other suitable temperature difference. The outside air temperature can be measured by one or more sensors on the aircraft and compared to a temperature threshold and when the threshold is exceeded, the temperature-based correction is applied. Other factors for triggering application of the temperature-based correction can also be used.

Figure 5:
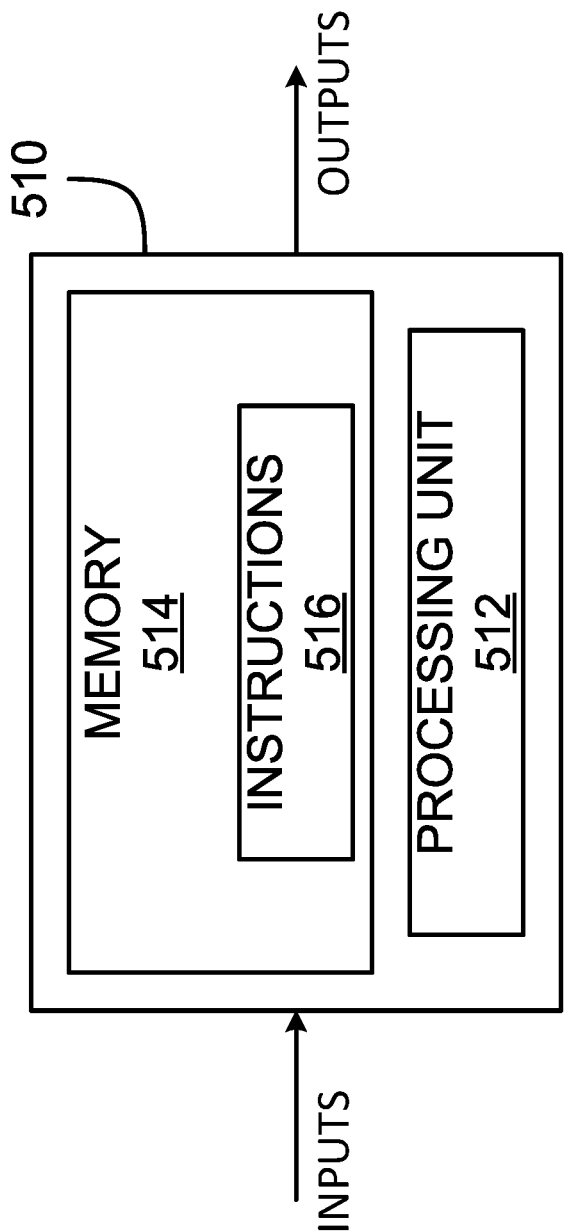
FIG. 5 is a schematic diagram of an example computing system for implementing the method of FIG. 4 in accordance with an embodiment.

With reference to FIG. 5, the method 400 can be implemented by a computing device 510, comprising a processing unit 512 and a memory 514 which has stored therein computer-executable instructions 516. The processing unit 512 can comprise any suitable devices configured to cause a series of steps to be performed so as to implement the method 400 such that instructions 516, when executed by the computing device 510 or other programmable apparatus, can cause the functions/acts/steps specified in the methods described herein to be executed. The processing unit 512 can comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The computing device 510 can be used solely to embody module 212 or module 212 can be a sub-component of the functions performed by computing device 510. In some embodiments, computing device 510 can form part or all of a full-authority digital engine controls (FADEC) or other similar device, including electronic engine control (EEC), engine control unit (EUC), and the like.

The memory 514 can comprise any suitable known or other machine-readable storage medium. The memory 514 can comprise a non-transitory computer readable storage medium such as, for example, but not limited to, an electronic, magnetic, optical, electromagnetic, infrared, or semiconductor system, apparatus, or device, or any suitable combination of the foregoing. The memory 514 can include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory can comprise any storage means (e.g., devices) suitable for retrievably storing machine-readable instructions executable by processing unit.

The methods and systems for correcting a vertical speed of an aircraft 10, described herein can be implemented in a high level procedural or object oriented programming or scripting language, or a combination thereof, to communicate with or assist in the operation of a computer system, for example the computing device 510. Alternatively, the methods and systems for correcting a vertical speed of an aircraft 10 described herein can be implemented in assembly or machine language. The language can be a compiled or interpreted language. Program code for implementing the methods can be stored on a storage media or a device, for example a ROM, a magnetic disk, an optical disc, a flash drive, or any other suitable storage media or device. The program code can be readable by a general or special-purpose programmable computer for configuring and operating the computer when the storage media or device is read by the computer to perform the procedures described herein. Embodiments of the methods described herein can also be considered to be implemented by way of a non-transitory computer-readable storage medium having a computer program stored thereon. The computer program can comprise computer-readable instructions which cause a computer, or more specifically the at least one processing unit of the computer, to operate in a specific and predefined manner to perform the functions described herein.

Computer-executable instructions can be in many forms, including program modules, executed by one or more computers or other devices. Generally, program modules include routines, programs, objects, components, data structures, etc., that perform particular tasks or implement particular abstract data types. Typically the functionality of the program modules can be combined or distributed as desired in various embodiments.

Various aspects of the methods and systems for correcting a vertical speed of an aircraft disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for correcting a vertical speed of an aircraft, the method comprising:
obtaining an instantaneous vertical speed of the aircraft based on inertial data from an inertial reference unit on the aircraft;
applying a first correction to the instantaneous vertical speed to generate a baro-inertial vertical speed; and
applying a second correction to the baro-inertial vertical speed based on an error between a geometric vertical speed and the baro-inertial vertical speed to obtain a temperature-corrected baro-inertial vertical speed,
wherein:
applying the second correction to the baro-inertial vertical speed comprises applying a time-based function of the error between the geometric vertical speed and a pressure altitude vertical speed;
the time-based function of the error is estimated as a moving-average of an instantaneous error between the geometric vertical speed and the baro-inertial vertical speed, over a given portion of time prior to a current time; and
the instantaneous error corresponds to:

$$Err_{inst} = \left(\frac{V_{z,Geom}}{V_{z,Press}} \cdot V_{z,BI} - V_{z,BI}\right)$$

where $V_{z,Geom}$ is the geometric vertical speed, $V_{z,Press}$ is the pressure altitude vertical speed, and $V_{z,BI}$ is the baro-inertial vertical speed.

2. The method of claim 1, wherein the given portion of time is about 20 seconds.

3. The method of claim 1, wherein the time-based function of the error is estimated as an output of a first order filter applied on the instantaneous error between the geometric vertical speed and the baro-inertial vertical speed, the first order filter having a time-constant that matches a time constant used to apply the first correction.

4. The method of claim 1, wherein $$\frac{V_{z,Geom}}{V_{z,Press}}$$

is computed as:

$$\frac{T_s}{T_i + T' \cdot H}$$

where $T_s$ is static temperature at a given altitude, $T_i$ is temperature at sea-level altitude, $T'$ is temperature lapse-rate, and $H$ is altitude.

5. The method of claim 4, wherein $T_s$ and $H$ are measured from air data sensors on the aircraft, and $H$ is approximated as pressure altitude.

6. The method of claim 1, wherein applying the first correction to the instantaneous vertical speed comprises applying the first correction using pressure altitude data for the aircraft.

7. A system for correcting a vertical speed of an aircraft, the system comprising:
a processing unit; and
a non-transitory memory communicatively coupled to the processing unit and comprising computer-readable program instructions executable by the processing unit for:
obtaining an instantaneous vertical speed of the aircraft based on inertial data from an inertial reference unit on the aircraft;
applying a first correction to the instantaneous vertical speed to generate a baro-inertial vertical speed; and
applying a second correction to the baro-inertial vertical speed based on an error between a geometric vertical speed and the baro-inertial vertical speed to obtain a temperature-corrected baro-inertial vertical speed,
wherein:
applying the second correction to the baro-inertial vertical speed comprises applying a time-based function of the error between the geometric vertical speed and a pressure altitude vertical speed;
the time-based function of the error is estimated as a moving-average of an instantaneous error between the geometric vertical speed and the baro-inertial vertical speed, over a given portion of time prior to a current time; and
the instantaneous error corresponds to:

$$Err_{inst} = \left(\frac{V_{z,Geom}}{V_{z,Press}} \cdot V_{z,BI} - V_{z,BI}\right)$$

where $V_{z,Geom}$ is the geometric vertical speed, $V_{z,Press}$ is the pressure altitude vertical speed, and $V_{z,BI}$ is the baro-inertial vertical speed.

8. The system of claim 7, wherein the given portion of time is about 20 seconds.

9. The system of claim 7, wherein the time-based function of the error is estimated as an output of a first order filter applied on the instantaneous error between the geometric vertical speed and the baro-inertial vertical speed, the first order filter having a time-constant that matches a time constant used to apply the first correction.

10. The system of claim 7, wherein $$\frac{V_{z,Geom}}{V_{z,Press}}$$

is computed as:

$$\frac{T_s}{T_i + T' \cdot H}$$

where $T_s$ is static temperature at a given altitude, $T_i$ is temperature at sea-level altitude, T' is temperature lapse-rate, and H is altitude.

11. The system of claim 10, wherein $T_s$ and H are measured from air data sensors on the aircraft, and H is approximated as pressure altitude.

12. The system of claim 7, wherein applying the first correction to the instantaneous vertical speed comprises applying the first correction using pressure altitude data for the aircraft.

* * * * *